United States Patent [19]

Hamamoto

[11] Patent Number: 5,606,784
[45] Date of Patent: Mar. 4, 1997

[54] ARTICLE RETAINER

[75] Inventor: Yoshiaki Hamamoto, Hiroshima, Japan

[73] Assignee: Nifco Inc., Yokohama, Japan

[21] Appl. No.: 472,112

[22] Filed: Jun. 7, 1995

[30] Foreign Application Priority Data

Jul. 28, 1994 [JP] Japan .................... 6-194628

[51] Int. Cl.⁶ .................................. F16B 21/07
[52] U.S. Cl. .................. 24/662; 24/573.1; 410/116; 411/508; 411/913
[58] Field of Search .................. 24/297, 573.1, 24/662; 410/116, 101, 106, 108, 110; 296/43, 63; 297/378.13; 411/182, 508, 509, 913; 248/503.1

[56] References Cited

U.S. PATENT DOCUMENTS

| 4,742,984 | 5/1988 | Cote et al. | 24/662 X |
| 4,822,092 | 4/1989 | Sweers | 24/662 X |
| 4,865,505 | 9/1989 | Okada | 411/913 X |

FOREIGN PATENT DOCUMENTS

| 62-12897 | 4/1987 | Japan . | |
| 5-294176 | 11/1993 | Japan | 248/503.1 |
| 1172458 | 12/1969 | United Kingdom | 24/662 |

Primary Examiner—James R. Brittain
Attorney, Agent, or Firm—Oblon, Spivak, McClelland, Maier & Neustadt, P.C.

[57] ABSTRACT

A article retainer includes an outer casing and an insert, the outer casing being formed as a hollow body having an engagement flange destined to cover the periphery of a mounting hole formed in a panel for insertion of the outer casing, a pair of engagement claws formed at diametrically opposite wall portions below the engagement flange to extend upward while maintaining flexing spaces between their inner surfaces and the wall portions and a pair of windows formed in diametrically opposite wall portions offset from the wall portions formed with the engagement claws by 90. The insert is formed as a hollow body of a size snugly fittable into the outer casing and having a pair of engagement projections formed at diametrically opposite outer wall portions for engagement with the windows and a pair of downward facing elastic engaging members formed at diametrically opposite inner wall portions for clamping the hook.

5 Claims, 5 Drawing Sheets

ARTICLE RETAINER

BACKGROUND OF THE INVENTION

1. Field of the Invention

This invention relates to a plastic article retainer for retaining an article with respect to a panel surface such as for retaining a hook mounted on a vehicle rear seat frame with respect to a floor surface (panel surface).

2. Description of the Prior Art

A prior art article retainer of this type is disclosed, for example, in Japanese Utility Model Publication Sho 62-12897.

The retainer described in this publication includes a hollow outer casing open at the top and provided on the back side with a plurality of protruding engagement claws for attaching the outer casing to a panel by inserting the outer casing into a mounting hole formed in the panel and a hollow insert open at the top and formed on its inner surface with elastic engagement members having downward facing catch surfaces for catching a hook.

The outer casing and the insert are engaged for preventing their separation by auxiliary engagement members. Specifically, a pair of outward directed claws formed on the outer surface of the insert are engaged with a pair of windows formed directly under the surface formed with the protruding engagement claws of the outer casing and the opposed surface of the outer casing.

Although the protruding engagement claws and one of the windows are formed on the same surface of the outer casing in this prior art retainer, they have to be widely spaced for preventing weakening of the engagement force of the protruding engagement claws. When the retainer is mounted on a panel, therefore, the outer casing projects downward a considerable distance and takes up a large amount of space under the panel.

Moreover, since the protruding engagement claws project from the outer surface of the outer casing and do not themselves exhibit elasticity, the peripheral thickness has to be made thin to give them adequate inward flexibility. Because of this, the strength of the retainer against shearing force is reduced. For example, when the retainer is used for securing a vehicle rear seat to the floor, the resistance to shearing force in the fore-aft direction is degraded.

This invention was accomplished to overcome these problems of the prior art and has as its object to provide an article retainer which has a outer casing of low height, takes up less space under the panel and exhibits increased strength against shearing force.

SUMMARY OF THE INVENTION

The invention achieves this object by providing an article retainer for retaining an article with respect to a panel by clamping a hook provided on the article, the article retainer comprising an outer casing and an insert, the outer casing being formed as a hollow body having an engagement flange destined to cover the periphery of a mounting hole formed in a panel for insertion of the outer casing, a pair of engagement claws formed at diametrically opposite wall portions below the engagement flange to extend upward while maintaining flexing spaces between their inner surfaces and the wall portions and a pair of windows formed in diametrically opposite wall portions offset from the wall portions formed with the engagement claws by 90 degrees, and the insert being formed as a hollow body of a size snugly fittable into the outer casing and having a pair of engagement projections formed at diametrically opposite outer wall portions for engagement with the windows and a pair of downward facing elastic engaging members formed at diametrically opposite inner wall portions for clamping the hook.

Since the engagement claws for engaging with the panel and the windows for receiving the engagement projections of the insert are formed at wall portions offset by 90 degrees and, further, since the engagement claws are formed to extend upward while maintaining flexing spaces between their inner surfaces and the wall portions, the thickness of the outer casing can be increased for obtaining large resistance to shearing force when the outer casing is mounted in the panel mounting hole.

The above and other features of the present invention will become apparent from the following description made with reference to the drawings.

DESCRIPTION OF THE PREFERRED EMBODIMENT

Figure 1:
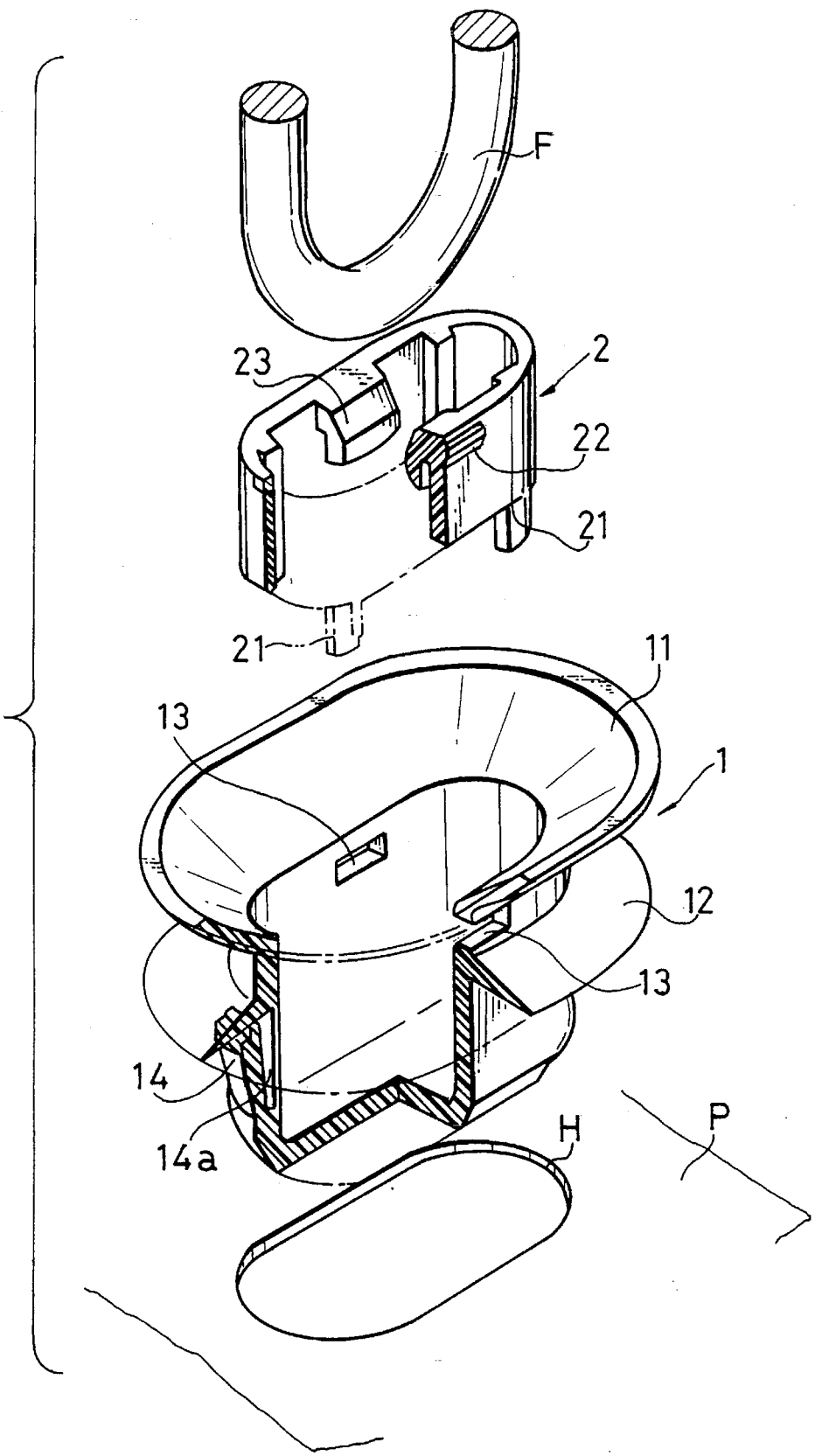
FIG. 1 is an exploded perspective view of a retainer which is an embodiment of the invention.
Figure 2:
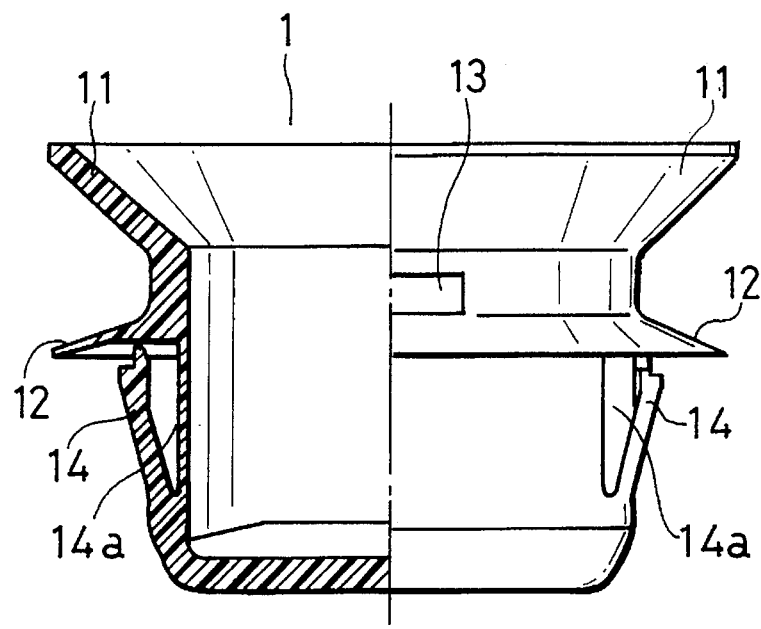
FIG. 2 is a front view, partially in section, of an outer casing of the retainer of FIG. 1.
Figure 3:
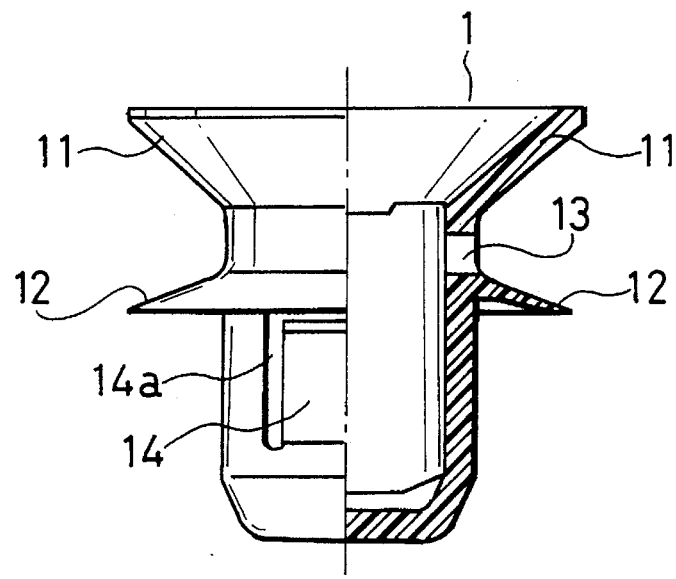
FIG. 3 is a side view, partially in section, of the outer casing of FIG. 2.
Figure 4:
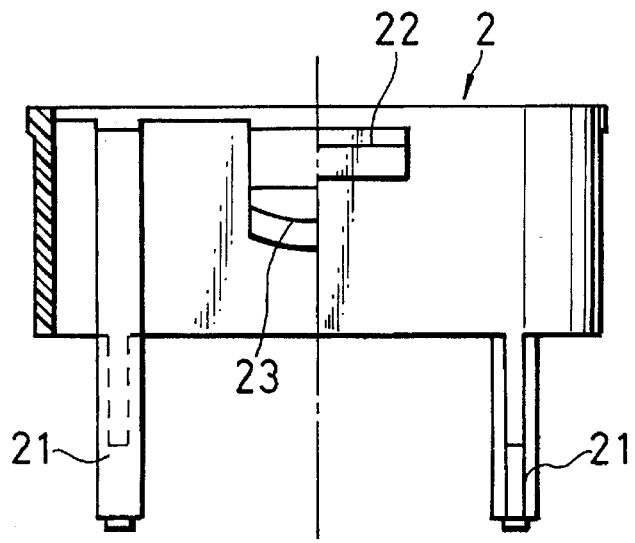
FIG. 4 is a front view, partially in section, of an insert of the retainer of FIG. 1.
Figure 5:
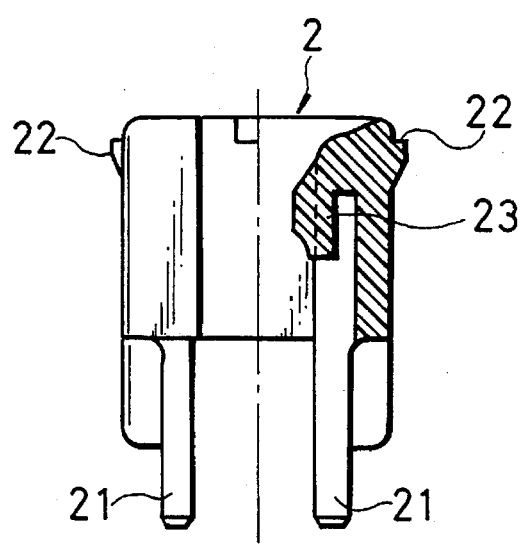
FIG. 5 is a side view, partially in section, of the insert of FIG. 4.
Figure 6:
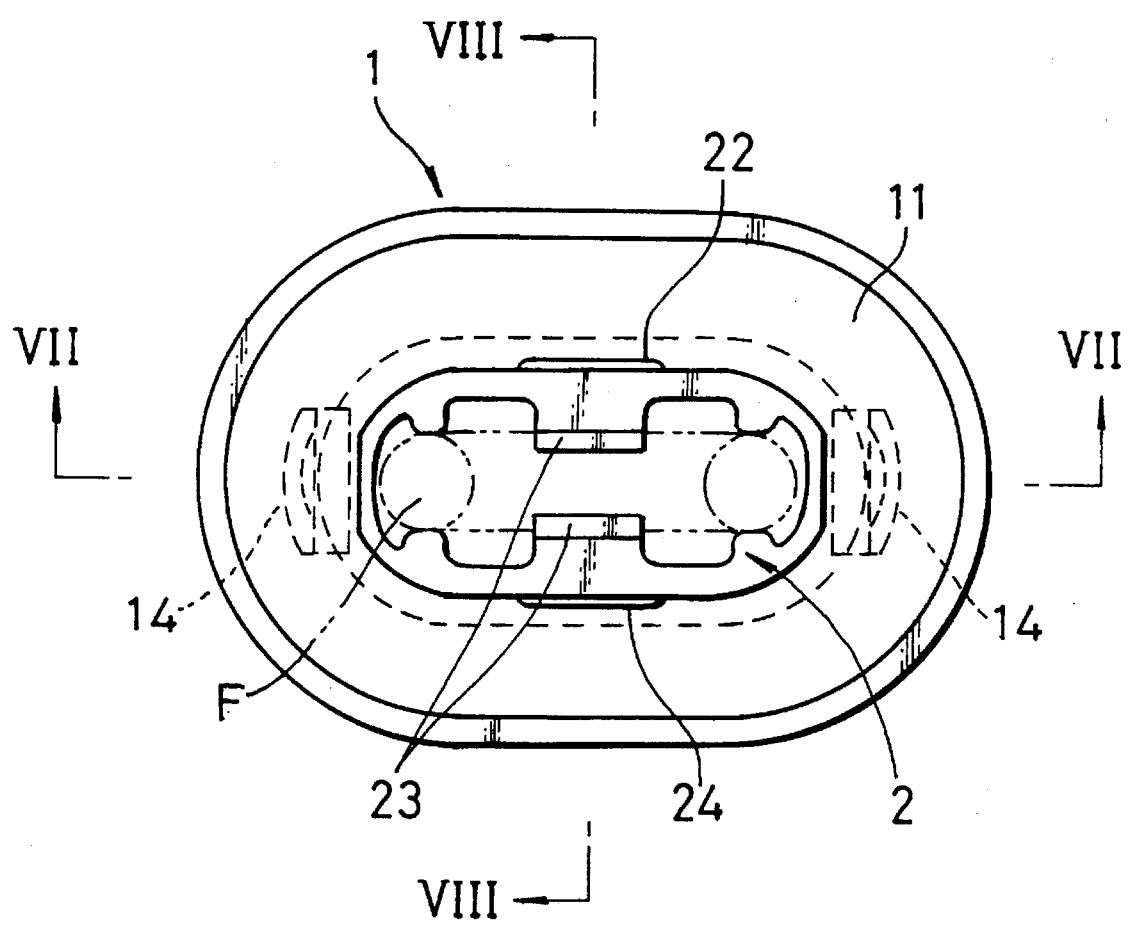
FIG. 6 is a plan view of the retainer of FIG. 1 in the assembled state.
Figure 7:
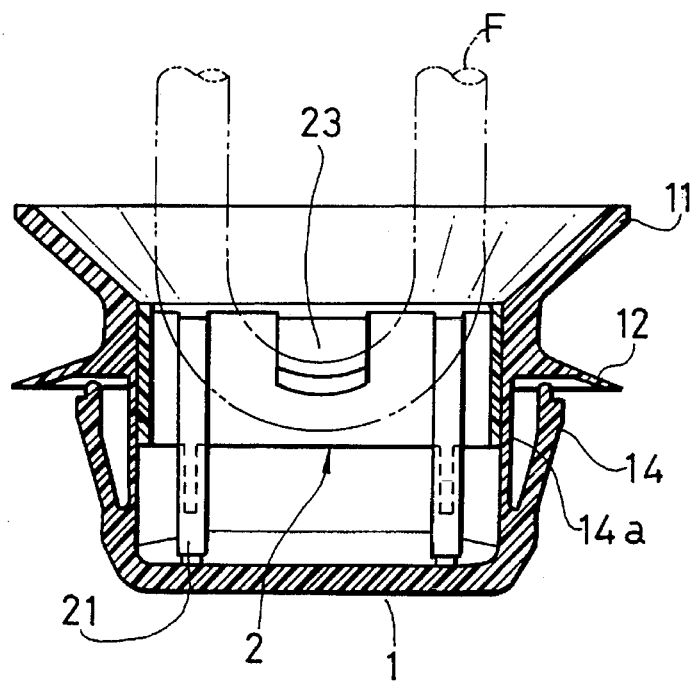
FIG. 7 is a sectional view taken along line VII—VII in FIG. 6.
Figure 8:
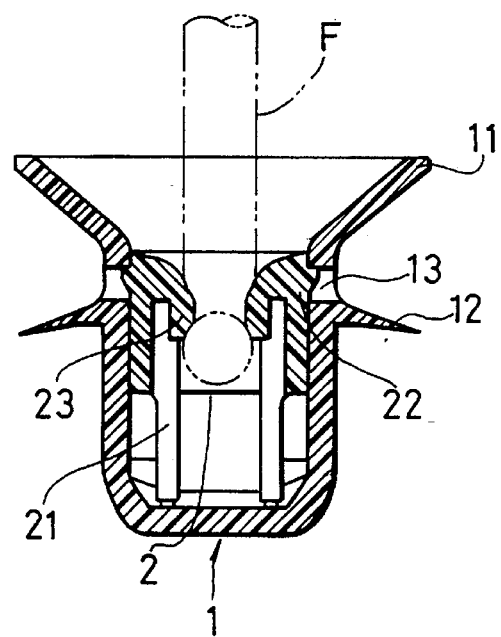
FIG. 8 is a sectional view taken along line VIII—VIII of FIG. 6.

An embodiment of the article retainer according to the invention will now be explained with reference to the drawings.

In the drawings, reference numeral 1 designates a plastic outer casing. Closed at the bottom and of oval shape as viewed from the top, the outer casing 1 is integrally formed at its upper edge with a flange 11 and above its middle portion with an engagement flange 12. The wall portion between the flanges 11 and 12 is formed at corresponding positions of the longer sides thereof with windows 13. A pair of engagement claws 14 are integrally formed at arcuate outer wall portions below the engagement flange 12 to extend upward while maintaining flexing spaces 14a between their inner surfaces and the outer wall.

The flange 11 flares upward in the shape of a funnel and is relatively thin. The engagement flange 12 flares downward in the manner of an inverted funnel and is increased in elasticity by being made thinner toward its outer edge.

Reference numeral 2 designates a tube-like insert formed of plastic in a shape complementary to that of the outer casing 1. The insert 2 is integrally formed on its bottom with four legs 21, at corresponding positions on the upper portions of the outer walls of its longer sides (the sides running at right angles to the sides formed with the engagement claws 14) with engagement projections 22 for engaging with the windows 13, and at corresponding positions on the inner walls of the same portions with elastic engaging members 23.

In FIG. 1, reference symbol P designates a panel, such as for fixing a vehicle seat frame, which is formed with a mounting hole H of a size for receiving the portion of the outer casing 1 below the engagement flange 12. By F is designated a hook, made from metal rod material or the like, fastened to the rear seat of a vehicle. Although the illustrated hook F is U-shaped, it may be L-shaped or otherwise configured.

The insert 2 has a shape as viewed from the top that is suited for snug insertion into the outer casing 1 and its height is matched to the distance between the floor and the flange 11 of outer casing 1.

The article retainer is assembled by first inserting the insert 2 into the outer casing 1 until the engagement projections 22 make contact with the opening of the outer casing 1. The insertion up to this point requires relatively little force. When further pressure is applied to the insert 2, its walls and the walls of the outer casing 1 flex owing to the presence of the engagement projections 22, allowing the insert 2 to be pushed in until the engagement projections 22 enter the windows 13 and the legs 21 rest on the floor of the outer casing 1.

The retainer assembled by fixing the insert 2 and outer casing 1 together in this manner is inserted into the mounting hole H in the panel P. In the course of this insertion, the engagement claws 14 first bend into the flexing spaces 14a and then snap back into contact with the undersurface of the panel P once they have passed through the mounting hole H. In this completed state of the insertion, the engagement flange 12 is flush with the upper surface of the panel P.

The panel P is thus clamped between the upper ends of the engagement claws 14 and the engagement flange 12, while the engagement flange 12 seals the edge of the mounting hole H and prevents intrusion of water, dust etc. from the underside of the panel P.

When the hook F is to be clamped in the retainer mounted in the panel P, it is pressed into the insert 2 from above against the elastic force of the elastic engaging members 23. The elastic engaging members 23 bend to allow passage of the hook F and then snap back to their original shape. Even if an outward force thereafter acts on the hook F, the hook is prevented from extraction by abutment on the tips of the elastic engaging members 23.

The flared shape of the flange 11 in this embodiment acts as a guide for the hook F, ensuring its easy entry into the insert 2 even if it should be somewhat out of alignment.

Since in the article retainer according to the invention the engagement claws for engaging with the panel and the windows for receiving the engagement projections of the insert are formed at wall portions offset by 90 degrees and, further, since the engagement claws are formed to extend upward while maintaining flexing spaces between their inner surfaces and the wall portions, the thickness of the outer casing can be increased for obtaining large resistance to shearing force when the outer casing is mounted in the panel mounting hole.

Moreover, the fact that the windows for receiving the engagement projections are formed at higher positions than the engagement claws enables the insert to be easily inserted into the outer casing, making the article retainer easy to assemble, and also facilitates insertion of the hook. In addition, it makes it possible to reduce the amount by which the outer casing projects from the panel and, as such, reduces the space requirement under the panel.

What is claimed is:

1. An article retainer for retaining an article with respect to a panel by clamping a hook provided on the article, the article retainer comprising:

an outer casing and an insert, the outer casing being formed as a hollow body having an engagement flange destined to cover a periphery of a mounting hole formed in a panel for insertion of the outer casing, a pair of engagement claws formed at diametrically opposite wall portions below the engagement flange to extend upward while maintaining flexing spaces between their inner surfaces and the wall portions and a pair of engagement portions formed in diametrically opposite wall portions offset from the wall portions formed with the engagement claws by 90 degrees, and the insert being formed as a hollow body of a size snugly fittable into the outer casing and having a pair of engagement projections formed at diametrically opposite outer wall portions for engagement with the engagement portions and a pair of downward facing elastic engaging members formed at diametrically opposite inner wall portions for clamping the hook.

2. An article retainer according to claim 1, wherein the engagement portions are formed on the outer casing at diametrically opposite positions above the engagement flange, the engagement projections of the insert for engagement with the engagement portions are formed at diametrically opposite upper portions of the insert, and the insert is formed with legs extending downward to a length such that they rest on a floor of the outer casing when the engagement projections engage with the engagement portions.

3. An article retainer according to claim 2, wherein the engagement portions are windows formed in the outer casing.

4. An article retainer according to claim 1, wherein the engagement portions are windows formed in the outer casing.

5. An article retainer for retaining an article with respect to a panel by clamping a hook provided on the article, the article rather comprising:

an outer casing and an insert, the outer casing being formed as a hollow body having an engagement flange destined to cover a periphery of a mounting hole formed in a panel for insertion of the outer casing, a pair of engagement claws formed at diametrically opposite wall portions below the engagement flange to extend upward while maintaining flexing spaces between their inner surfaces and the wall portions and a pair of windows formed in diametrically opposite wall portions positioned above the engagement flange and offset from the wall portions formed with the engagement claws by 90 degrees, and the insert being formed as a hollow body of a size snugly fittable into the outer casing and having a pair of engagement projections formed at diametrically opposite outer upper wall portions for engagement with the windows, a pair of downward facing elastic engaging members formed at diametrically opposite inner wall portions for clamping the hook, and legs extending downward to a length such that they rest on a floor of the outer casing when the engagement projections engage with the windows.

* * * * *